US011102459B2

(12) United States Patent
Xu et al.

(10) Patent No.: US 11,102,459 B2
(45) Date of Patent: Aug. 24, 2021

(54) 3D MACHINE-VISION SYSTEM (71) Applicant: eBots Inc., Fremont, CA (US)

(72) Inventors: Zheng Xu, Pleasanton, CA (US); Kai C. Yung, Livermore, CA (US); MingDu Kang, Pleasanton, CA (US)

(73) Assignee: eBots Inc., Fremont, CA (US)

( * ) Notice: Subject to any disclaimer, the term of this patent is extended or adjusted under 35 U.S.C. 154(b) by 158 days.

(21) Appl. No.: 16/531,899

(22) Filed: Aug. 5, 2019

(65) Prior Publication Data

US 2020/0053328 A1 Feb. 13, 2020

Related U.S. Application Data (60) Provisional application No. 62/718,174, filed on Aug. 13, 2018, provisional application No. 62/723,139, filed on Aug. 27, 2018.

(51) Int. Cl.
| *H04N 9/31* | (2006.01) |
| *H04N 9/04* | (2006.01) |
| *H04N 19/25* | (2014.01) |
| *H04N 5/74* | (2006.01) |
| *G03B 21/14* | (2006.01) |

(52) U.S. Cl.
CPC ......... *H04N 9/3129* (2013.01); *H04N 5/7458* (2013.01); *H04N 9/04521* (2018.08); *H04N 9/3161* (2013.01); *H04N 19/25* (2014.11)

(58) Field of Classification Search
CPC ........ G03B 21/14; H04N 9/31; H04N 9/3161; H04N 9/04521; H04N 5/7558; H04N 19/25
See application file for complete search history.

(56) References Cited

U.S. PATENT DOCUMENTS

| 10,877,622 | B2 * | 12/2020 | Romano | G06K 9/2036 |
| 2010/0220293 | A1 * | 9/2010 | Mizushima | G09F 19/12 353/20 |
| 2011/0037953 | A1 * | 2/2011 | Nizani | H04N 9/3173 353/38 |
| 2019/0184570 | A1 * | 6/2019 | Yung | B25J 9/161 |

* cited by examiner

*Primary Examiner* — William C. Dowling
(74) *Attorney, Agent, or Firm* — Shun Yao; Park, Vaughan, Fleming & Dowler LLP (57) ABSTRACT

One embodiment can provide a machine-vision system. The machine-vision system can include a structured-light projector, a first camera positioned on a first side of the structured-light projector, and a second camera positioned on a second side of the structured-light projector. The first and second cameras are configured to capture images under illumination of the structured-light projector. The structured-light projector can include a laser-based light source.

19 Claims, 9 Drawing Sheets

3D MACHINE-VISION SYSTEM

RELATED APPLICATION

This claims the benefit of U.S. Provisional Patent Application No. 62/718,174, entitled "Method to Improve the Depth of Field (DOF) of Structured Light," filed Aug. 13, 2018; and U.S. Provisional Patent Application No. 62/723, 139, entitled "A 3D Machine Vision System," filed Aug. 27, 2018, the disclosures of which are incorporated herein by reference in their entirety for all purposes.

BACKGROUND

Field

This disclosure is generally related to machine-vision systems. More specifically, this disclosure is related to a three-dimensional (3D) machine-vision system with improved performance.

Related Art

Automation (e.g., the use of robots) has been widely used and is transforming manufacturing in the automotive and industrial equipment industries. More specifically, the robot density has reached 1,414 (per 10,000 workers) in the automotive industry in Japan and 1,141 in the United States. However, the rapidly growing electrical/electronics industries have been lagging in the implementation of robots in their production lines. The robot density in the electronics industry is merely 318 in United States and just 20 in China. More specifically, when producing consumer electronics (e.g., smartphones, digital cameras, tablet or laptop computers, etc.), the assembly work is still largely performed by human workers. This is because there are many challenges in adopting robotics in the manufacturing of consumer electronics.

In order for a robot to perform highly complex assembly tasks, the robot needs to be able to "see" its environment and incoming components and parts in a precise manner, perform inspections, and make proper adjustments. This requires the vision system of the robot to have the functions of searching, tracking, and determining the poses of various components. A 3D machine-vision system with a large depth of field (DOF) and a high speed is desired.

SUMMARY

One embodiment can provide a machine-vision system. The machine-vision system can include a structured-light projector, a first camera positioned on a first side of the structured-light projector, and a second camera positioned on a second side of the structured-light projector. The first and second cameras are configured to capture images under illumination of the structured-light projector. The structured-light projector can include a laser-based light source.

In a variation on this embodiment, the laser-based light source can include at least one semiconductor laser diode.

In a variation on this embodiment, an optical axis of the first or second camera and an optical axis of the structured-light projector can form an angle that is between 20° and 30°.

In a further variation, a field of view (FOV) of the first camera can substantially overlap a FOV of the second camera.

In a variation on this embodiment, the structured-light projector can be configured to project one or more of: a binary encoded pattern and a non-binary encoded pattern.

In a variation on this embodiment, the machine-vision system can further include an image-processing unit configured to process images provided by the first and second cameras. The image-processing unit can be configured to adjust an allowed dynamic range of the images provided by the first and second cameras, thereby reducing specular reflection included in the images.

In a variation on this embodiment, the structured-light projector comprises a digital micromirror device (DMD) while maintaining the parallelism of the beam.

In a further variation, the structured-light projector can include a double-telecentric lens for expanding a beam reflected by the DMD.

In a variation on this embodiment, the machine-vision system can further include a third camera positioned between the first camera and the structured-light projector. The third camera is configured to capture images under normal illumination.

In a further variation, the machine-vision system can further include a fourth camera positioned between the second camera and the structured-light projector. The fourth camera is configured to capture images under normal illumination.

In a further variation on this embodiment, a field of view (FOV) of the third camera is larger than the FOV of the first or second camera.

In a variation on this embodiment, the first or second camera comprises a lens and an image sensor, and the image sensor is tilted at an angle with respect to the lens.

In a further variation, the angle is between 0° and 8°.

One embodiment can provide a structured-light projector for a three-dimensional (3D) imaging system. The structured-light projector can include a laser-based light source, a collimator for collimating light emitted by the light source, a digital micromirror device (DMD) for reflecting the collimated light, and a beam expander for expanding a light beam reflected off the DMD.

In a variation on this embodiment, the laser-based light source comprises at least one semiconductor laser diode.

In a variation on this embodiment, the structured-light projector can be configured to project one or more of: a binary encoded pattern and a non-binary encoded pattern.

In a variation on this embodiment, the beam expander can include a double-telecentric lens.

In a variation on this embodiment, a frame rate of the structured-light projector can be at least 10 frames per second.

In a variation on this embodiment, the DMD can include a two-dimensional array of micromirrors.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of providing a 3D machine-vision system that can capture accurate 3D images at a high speed. The 3D machine-vision system can include two pairs of cameras. Each camera in a first pair of cameras has a larger field of view (FOV) that that of a second pair of cameras and both camera are configured to capture images under normal illumination. This camera pair can be used in situations where high-speed image capturing is needed. A second pair of cameras is used to capture images under structured-light illumination. A multimode diode laser can be used as the light source for the projector that projects the structured light. The high intensity light provided by the laser increases the image capturing speed. This dual camera setup can eliminate specular reflection and increase the overall depth of field (DOF) of the 3D machine-vision system. To further increase the DOF, the image sensor of each camera can be slightly tilted with respect to the corresponding lens.

3D Machine-Vision System

Figure 1:
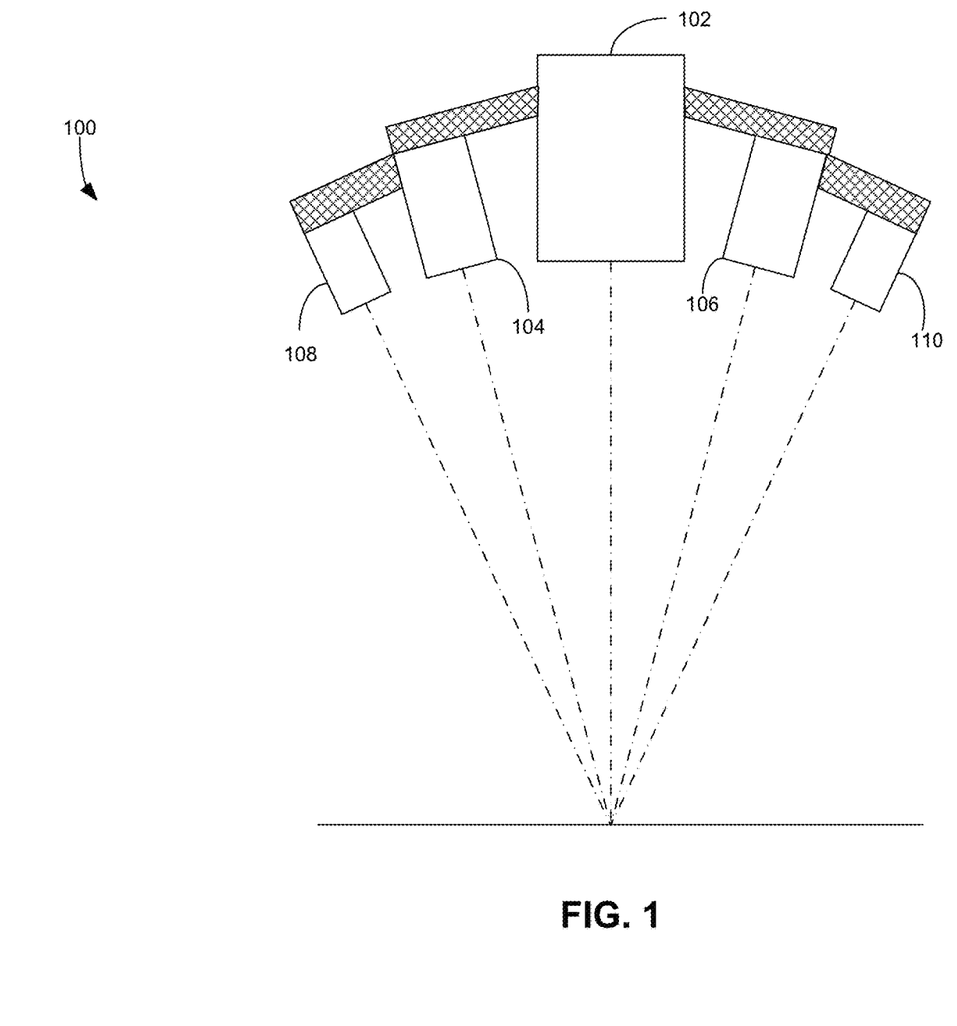
FIG. 1 illustrates an exemplary 3D machine-vision system, according to one embodiment.

FIG. 1 illustrates an exemplary 3D machine-vision system, according to one embodiment. Machine-vision system 100 can include a structured-light projector 102, 2D cameras 104 and 106, and 3D cameras 108 and 110. Structured-light projector 102 can be responsible for projecting structured light onto a scene whose images are to be captured. Structured-light illumination has been widely used to obtain 3D information about objects. The term "structured light" refers to active illumination of a scene with specially designed, spatially varying intensity patterns. An image sensor (e.g., a camera) acquires 2D images of the scene under the structured-light illumination. If the scene is a planar surface without any 3D surface variation, the pattern shown in the acquired image is similar to that of the projected structured-light pattern. However, when the surface in the scene is non-planar, the geometric shape of the surface distorts the projected structured-light pattern as seen from the camera. The principle of structured-light 3D surface imaging techniques is to extract the 3D surface shape based on the information from the distortion of the projected structured-light pattern. Accurate 3D surface profiles of objects in the scene can be computed by using various structured-light principles and algorithms.

Figure 2A:
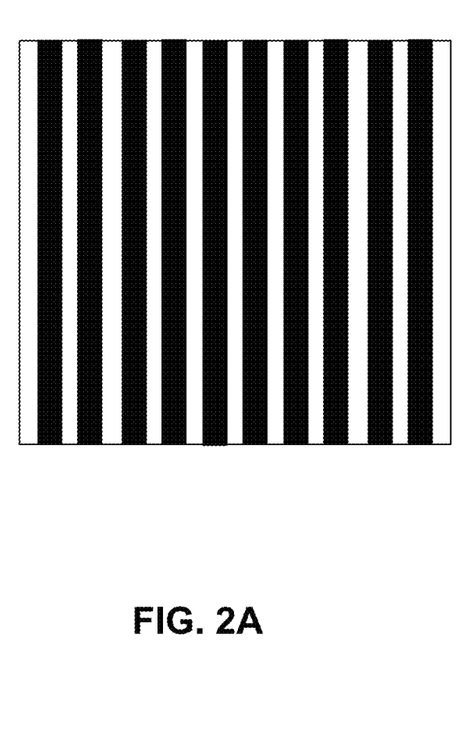
FIG. 2A illustrates an exemplary binary illumination pattern.
Figure 2B:
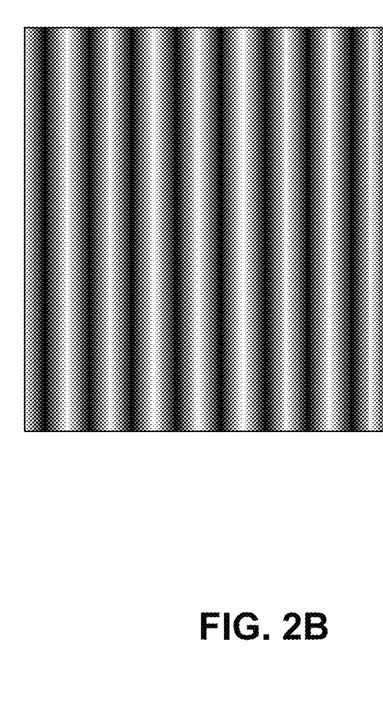
FIG. 2B illustrates an exemplary non-binary illumination pattern, according to one embodiment.

In a conventional structured-light illumination system, a binary codification scheme is often used to encode the scene using two intensity values: black (intensity 1) and white (intensity 0). FIG. 2A illustrates an exemplary binary illumination pattern. The binary pattern can include a series of alternating black and white stripes. However, binary encoding can result in an image resolution limited by the resolution of projected binary pattern. To increase the image resolution, in some embodiments, instead of binary encoding, the projected illumination pattern can be non-binary. More specifically, instead of step functions (which results in black and white stripes), the intensity of the illumination pattern can be a sinusoidal function. FIG. 2B illustrates an exemplary non-binary illumination pattern, according to one embodiment. As one can see, instead of abrupt changes at the stripe boundary, the light intensity can change gradually. In addition to stripes, other encoded patterns, such as dot array or grid, can also be used as the structured light.

Figure 3:
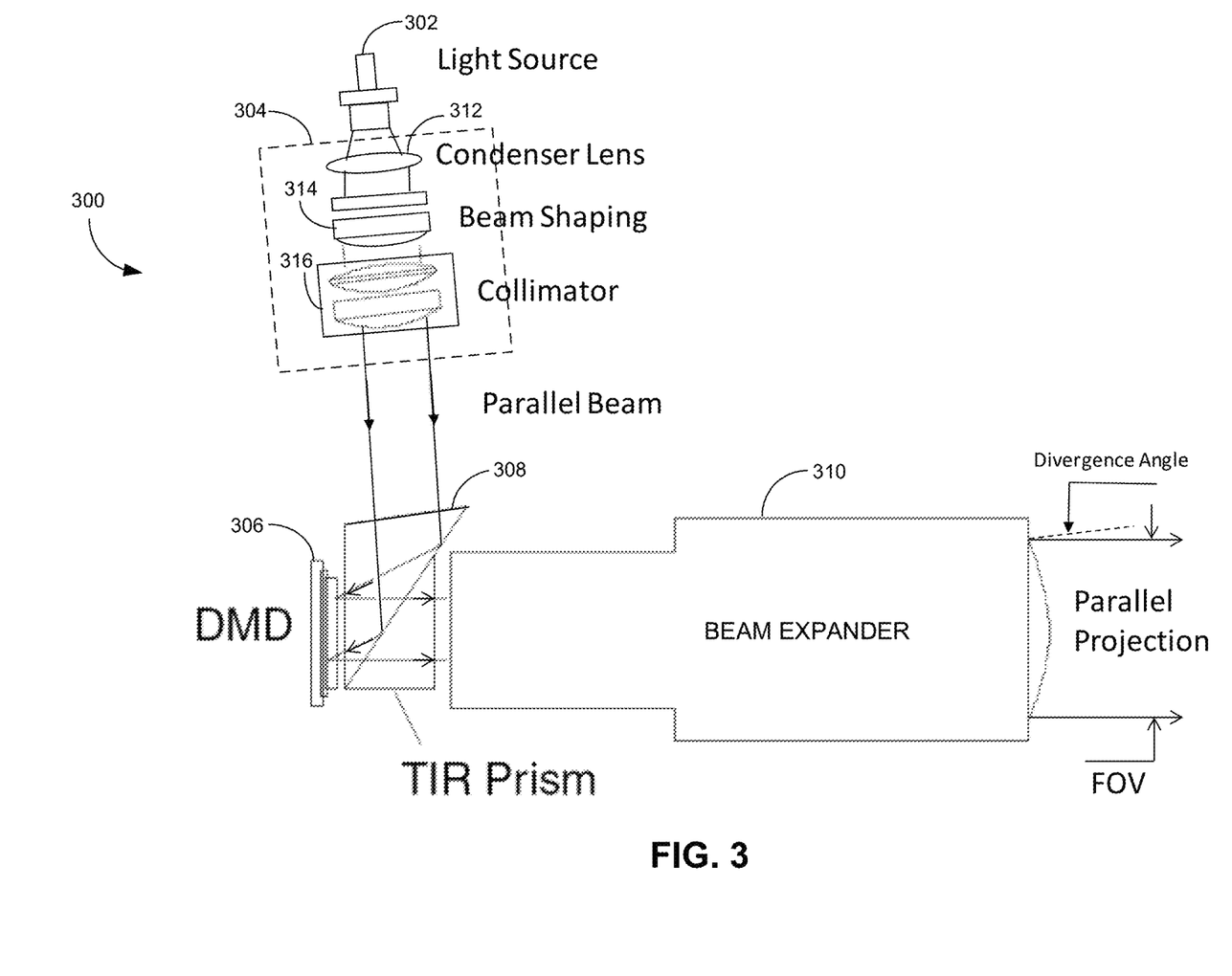
FIG. 3 shows an exemplary Digital Light Processing (DLP) projector, according to one embodiment.

In some embodiments, structured-light projector 102 can include a Digital Light Processing (DLP) projector, which can provide a high frame rate and a high resolution. In further embodiments, a digital micromirror device (DMD) can be included in the DLP projector to facilitate the DLP projector to project the codified patterns onto a scene. FIG. 3 shows an exemplary Digital Light Processing (DLP) projector, according to one embodiment. DLP projector 300 includes a light source 302, a lens system 304, a DMD 306, a prism 308, and a beam expander 310.

Light source 302 can include a multimode laser (e.g., a semiconductor laser diode). Compared to a light-emitting diode (LED), a laser can provide a much higher intensity and parallelism as the light passes through optical systems while consuming less energy. The typical light intensity projected by a DLP projector using a diode laser can be about a few milliwatts per square centimeter (e.g., 6 mw/cm$^2$), whereas the typical light intensity provided by an LED can be less than one milliwatt per square centimeter (e.g., 0.2 mw/cm$^2$). The higher light intensity correlates to a shorter exposure time, which can lead to a faster image-capturing speed. Moreover, the low energy consumption of the laser can also prevent the problem of overheating.

Another advantage provided by a laser is its extremely small etendue, which makes it possible to generate a highly collimated beam. The small divergence of the projected light can lead to an increased depth of field (DOF) of the light projector. Compared to an LED-based projector, the laser-based projector can have a much larger DOF. Note that a multimode laser is used as light source 302 due to its reduced coherence length. Such a quality is advantageous, because it can reduce speckles within the projected light. In some embodiments, light source 302 can include a single laser diode with tunable wavelengths or multiple laser diodes of different wavelengths. This allows light source 302 to emit light of a desired wavelength based on the surface condition of the illuminated components. In further embodiments, light source 302 can emit visible or invisible (including infrared and ultraviolet) light.

Lens system 304 can be responsible for converting light emitted by light source 302, which can be a point source, to parallel beams. To do so, lens system 304 includes a number of lenses, including condenser lens 312, beam-shaping lens 314, and collimator 316.

Figure 4:
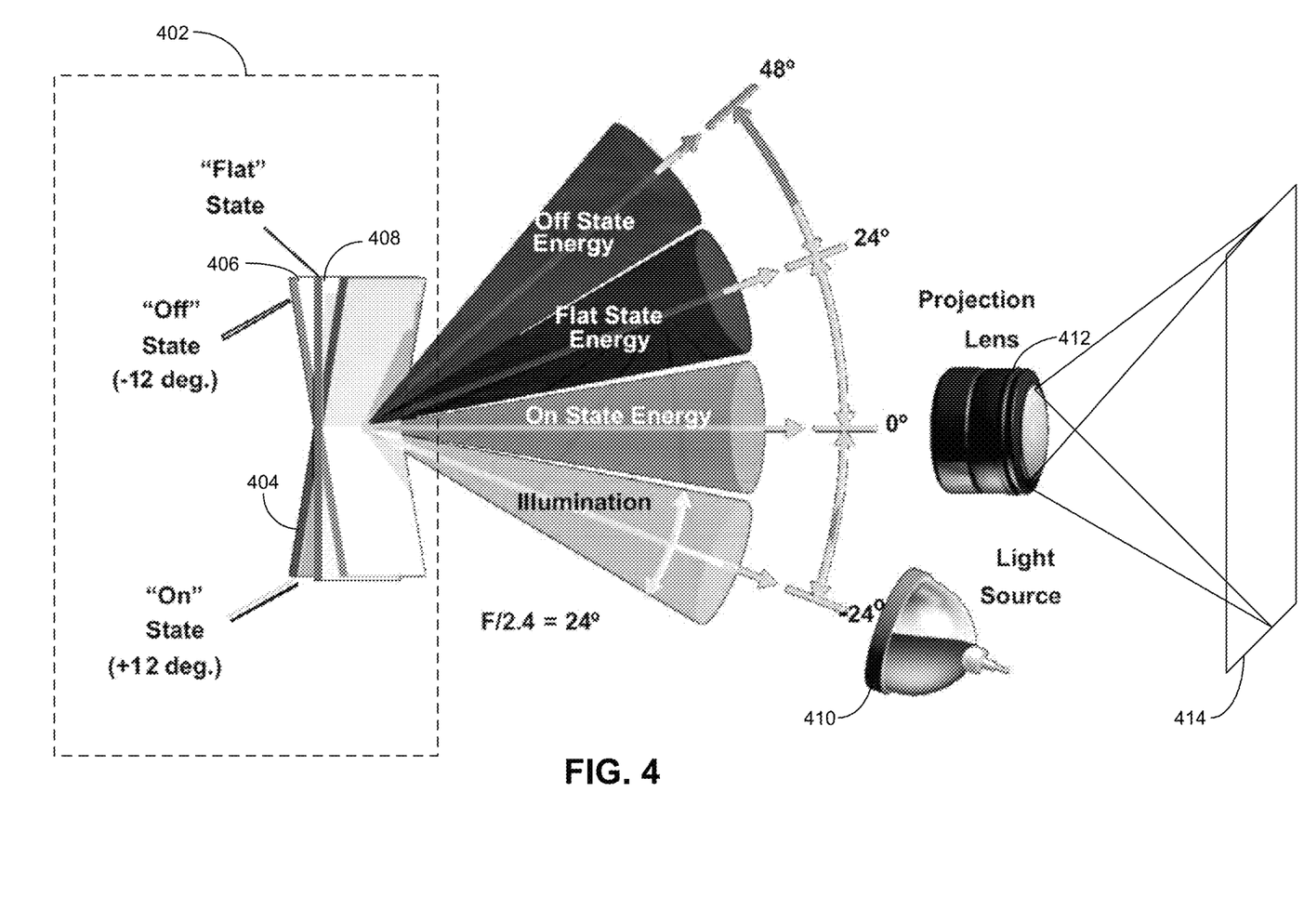
FIG. 4 shows the operation principle of a digital micromirror device (DMD), according to one embodiment.

DMD 306 is a bi-stable spatial light modulator. In some embodiments, DMD 306 can include a two-dimensional (2D) array (e.g., a 1280×720 array) of movable micromirrors functionally mounted over a CMOS memory cell. Each mirror can be independently controlled by loading data into the CMOS memory cell to steer reflected light, spatially mapping a pixel of video data to a pixel on a display. FIG. 4 shows the operation principle of a digital micromirror device (DMD), according to one embodiment. More specifically, FIG. 4 shows that the data (e.g., a bit) can electronically control mirror 402's tilt angle in a binary fashion. Mirror 402 can be in an "on" state 404 or an "off" state 406. When in "on" state 404, the tilt angle of mirror 402 can be a positive angle (e.g.,) +12°), and light from light source 410 can be steered by mirror 402 to a projection lens 412 and can then be projected onto a screen 414. On the other hand, when in "off" state 406, the tilt angle of mirror 402 can be a negative angle (e.g., −12°), and the light will be steered away from screen 414. Mirror 402 can also have a "flat" state 408, where mirror 402 is not tilted. When mirror 402 is in "flat" state 408, it also steers the light away from screen 414. Therefore, by switching the individual micromirrors on and off, a pattern of bright (or white) and dark (or black) pixels can be created.

As discussed previously, non-binary patterns of the projected light can improve the image resolution. For this to happen, in some embodiments, additional states can be added to the mirrors. For example, instead of being "on" or "off," a mirror can be partially "on" or partially "off," which means that the mirror can reflect a portion of the projected light onto screen 414.

Returning to FIG. 3, prism 308 is used here to change the direction of the parallel beam, and beam expander 310 can be used to expand the size of the parallel beam. Expanding the beam can further decrease the divergence angle, thus increasing the DOF of DLP projector 300. Various types of beam expander can be used to increase the size of the parallel beam, including but not limited to: a Keplarian beam expander, a Galilean beam expander, and a double-telecentric lens system. In some embodiments, beam expander 310 can include a double-telecentric lens system, which can expand the beam with little to no distortion and divergence.

In one exemplary embodiment, light source 302 can include a GaN laser diode having a wavelength of 405 nm. A typical divergence angle of the laser beam can be 27° along the fast axis and 7° along the slow axis. The thickness of the resonance cavity of the laser can be about 265 nm, and the exit window and the beam spot size can have a similar dimension. Per conservation of etendue, after the beam passes through collimator 316 to form a beam of 7 mm in diameter, the divergence angle of the beam can decrease to approximately 0.001°, becoming a highly collimated beam. Beam expander 310 can further increase the beam size to 55.3 mm, and the divergence angle can decrease to about 1.3 e-4°. The distance between the screen and the DLP projector can be 300 mm. Exemplary DLP projector 300 can project 1280×720 pixels, with the size of each pixel being roughly 40×40 μm$^2$. Note that, for a perfect beam and a 300 mm projection distance, the DOF can be up to 17,600 mm if the resolution is 40 microns. In comparison, the DOF of an LED-based DLP projection is typically less than 5 mm.

Returning to FIG. 1, 2D cameras 104 and 106 are located on either side of the optical axis of structured-light projector 102. Here the term 2D camera refers to the fact that cameras 104 and 106 capture images under normal illumination (i.e., no structured light), and images captured by each camera contain only 2D information. However, because cameras 104 and 106 are separately located and are viewing the scene from different angles, 3D information can be extracted when images from cameras 104 and 106 are combined. This can enable a faster image processing compared to the situation where structured light is used for illumination, because 3D imaging based on structured light requires a camera to capture multiple images in order to extract 3D information. Moreover, although 2D cameras 104 and 106 capture images at a lower resolution, compared to 3D cameras 108 and 110, 2D cameras 104 and 106 can have a relatively large FOV. In some embodiments, each dimension of the FOV of each 2D camera can be a few hundreds of millimeters, whereas the dimension of the FOV of each 3D camera can be a few tens of millimeters. For example, the FOV of a 2D camera can be 150×100 mm$^2$, whereas the FOV of a 3D camera can be 50×40 mm$^2$. The different FOVs and resolutions provided by the two camera pairs provide operational flexibility. For example, the 2D cameras can be used to scan a larger area to identify a component, whereas the 3D cameras can be used to zoom in to capture more detailed images of a single component.

3D cameras 108 and 110 are located on either side of structured-light projector 102. In some embodiments, 3D cameras 108 and 110 can be symmetrically aligned with each other with respect to the optical axis of structured-light projector 102. Cameras 108 and 110 are referred to as 3D cameras because they capture images under the illumination of structured light, which can include a sequence of coded patterns projected onto the scene. In some embodiments, the coded patterns can include binary patterns, such as black and white stripes, where the light intensity along a particular direction can be a square-wave function. In some embodiments, the coded patterns can include non-binary patterns, where the light intensity along a particular direction can be a sinusoidal function. In addition to the one-dimensional pattern consisting of stripes, it is also possible to have two-dimensional binary or non-binary patterns (e.g., a dot array or a grid) projected onto the scene.

The projection speed of structured-light projector 102 can be between 10 and 20 frames per second (e.g., 13 frames per second) or higher (e.g., up to 2500 frames per second). 3D cameras 108 and 110 can be synchronized with structured-light projector 102 such that each camera captures at least one image for each projected pattern. Usually the image capture rate is limited by the maximum frame rate of the camera.

In some embodiments, the distance from the lens of each 3D camera to the to-be-imaged object can be similar to the distance from the structured-light projector 102 to the to-be-imaged object. In some embodiments, such a distance can be kept at about 300 mm. In other words, the working distance of each 3D camera is about 300 mm. The working distance of each 2D camera can also be similar. The angle formed between the optical axis of each 3D camera and the optical axis of structured-light projector 102 can be between 20° and 30°. On the other hand, the angle formed between the optical axis of each 2D camera and the optical axis of structured-light projector 102 can be between 10° and 25°. The optical axes of structured-light projector 102, 3D camera 108, and 3D camera 110 can intersect at the same point. The FOV of 3D camera 108 can substantially overlap with the FOV of 3D camera 110. In one embodiment, the FOV of each 3D camera can be between 50 mm×20 mm and 100 mm×50 mm (e.g., roughly 49×43 mm$^2$ or 56×42.6 mm$^2$), depending on the setting of the camera. Depending on the optical system used in structured-light projector 102, the field of projection (FOP) of structured-light projector 102 can be smaller or larger than the FOV of the 3D cameras. If the FOP is smaller than the FOV of the 3D cameras, the system is configured such that the FOP of structured-light projector 102 is mostly confined within the boundaries of the FOV of the 3D cameras. In some embodiments, the FOP of structured-light projector 102 can be between 50 mm×20 mm and 100 mm×50 mm (e.g., 51.2×28.8 mm$^2$ or 52.5×29 mm$^2$).

In order to obtain 3D images of an object, during operation, structured-light projector 102 projects a sequence of coded patterns onto the object, and the pattern images are simultaneously recoded by 3D cameras 108 and 110. When machine-vision system 100 is calibrated, the 3D coordinates of the object can be reconstructed via various algorithms. Inputs to the algorithm can include the coordinates of the cameras, the coordinates of the projector, and the recorded patterns. Various algorithms (e.g., a phase-shifting algorithm) can be used to extract 3D information from the captured images. Practical implementations of the structured-light algorithm are beyond the scope of this disclosure.

Note that, although one camera is sufficient to capture 3D information under the illumination of the structured light, the additional camera can provide the benefit of reducing the amount of specular reflection, which is a type of surface reflectance described as a mirror-like reflection. Such reflections can cause overexposure (e.g., the specular highlight) and are often undesirable. The two-camera setup as shown in FIG. 1, where two separate cameras are located on opposite sides of the structured-light projector, can efficiently reduce the specular reflection. Because specular reflection is highly directional, specular light reflecting into one camera is less likely to reach the other camera. Hence, information associated with a region that causes specular reflection in one camera can be captured by the other camera. In some embodiments, to reduce specular reflection, the dynamic range of each camera can be configured to cut off signals caused by specular reflection (which typically has a high light intensity). More specifically, during image processing, the allowed dynamic range of each image can be adjusted, and data exceeding the allowed dynamic range can be removed. For example, if the intensity of a particular pixel exceeds the allowed dynamic range, data representing that particular pixel can be removed. Alternatively, the system can identify specular reflection within a captured image (i.e., a bright spot) and then removes such a spot from the captured image. Doing so can result in loss of information of the region creating the specular reflection at one camera; however, such information can be captured by the other camera. More specifically, that particular region may create specular reflection at one camera but diffusive reflection at the other camera. The diffusive reflection can provide sufficient information, including topology information, about that particular region. Hence, by adjusting the camera's dynamic range, one can reduce or eliminate the specular reflection received at one camera, and information lost at that camera can be captured by the other camera. When data from the two cameras are combined, one can construct a complete image of the scene without the specular highlight.

Figure 5:
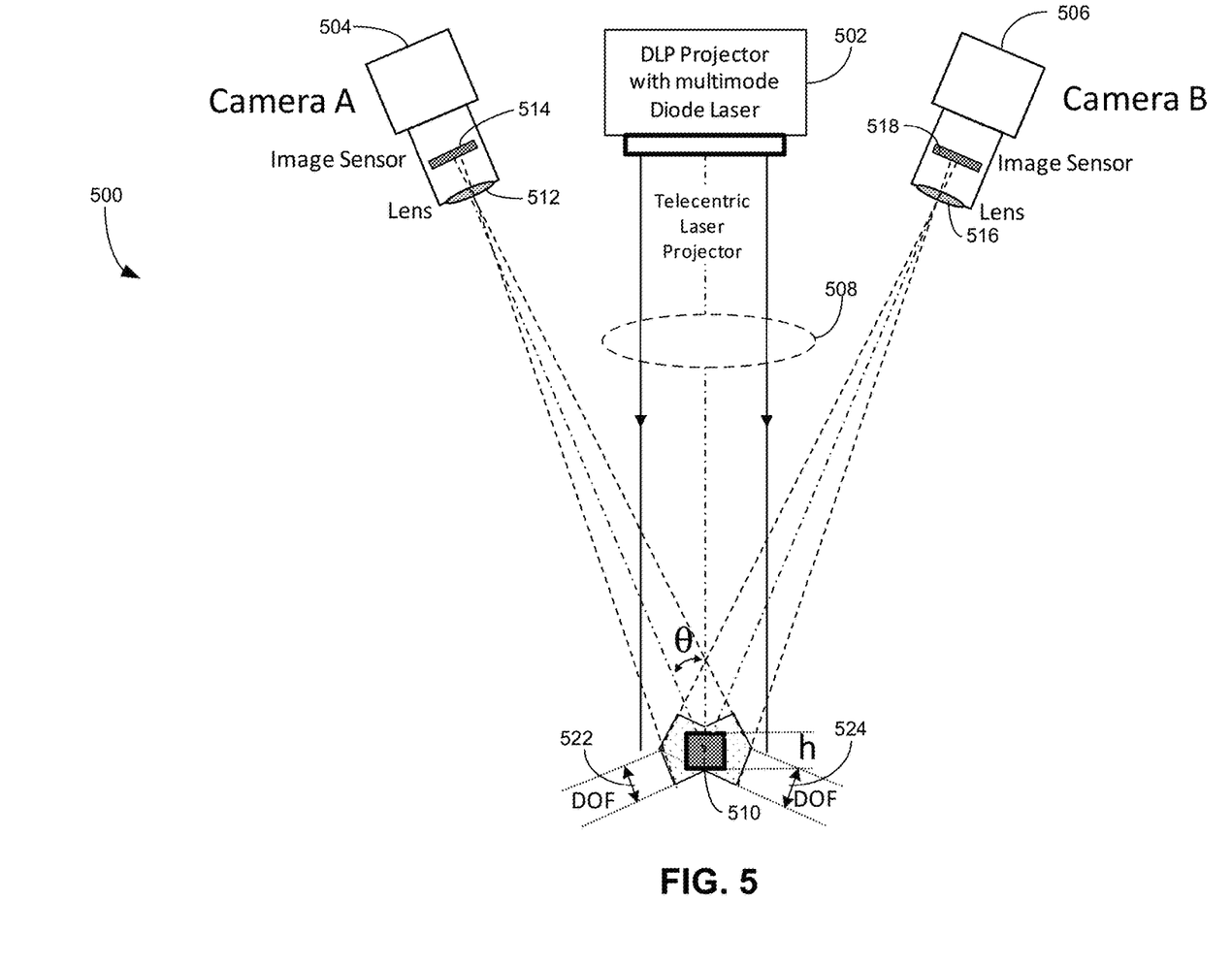
FIG. 5 illustrates in more detail an exemplary two-camera setup, according to one embodiment.

The additional camera can also increase the overall DOF of the camera system. FIG. 5 illustrates in more detail an exemplary two-camera setup, according to one embodiment. Camera setup 500 includes a structured-light projector (e.g., a DLP projector) 502 and cameras 504 and 506. As discussed previously, structured-light projector 502 can include a light source based on a multimode laser and can project a high-intensity parallel beam 508 onto an object 510. The speed of structured-light projector 502 can be between 10 and 20 frames per second or higher (e.g., up to 2500 frames per second). The distance between structured-light projector 502 and the object can be a few hundred millimeters (e.g., 300 mm).

Camera 504 can include a lens 512 and an image sensor 514. Similarly, camera 506 can include a lens 516 and an image sensor 518. Each lens can be configured such that its focal length can be roughly the same as the distance between structured-light projector 502 and object 510. For example, if the distance between structured-light projector 502 and object 510 is 300 mm, the focal length of lens 512 or 516 can be roughly 300 mm. Moreover, cameras 504 and 506 are tilted with respect to the optical axis of structured-light projector 502. In some embodiments, the angle between the optical axis of camera 504 or 506 and the optical axis of structured-light projector 502 (i.e., angle θ shown in FIG. 5) can be between 20° and 30° (e.g., 25°).

When a camera is tilted with respect to the horizontal plane, the effective depth of field (DOF) of the camera can be reduced. In FIG. 5, the DOF of each camera is shown by a double arrow (e.g., double arrow 522 or 524). When such a DOF is projected onto a horizontal plane, it is reduced by a factor of cos θ. This can make it difficult for a single camera to focus at both the far and near edges of an object, especially a wide and tall object. However, in two-camera setup 500, the two cameras (i.e., cameras 504 and 506) can compensate for each other in such a way that a blurry edge seen by one camera can be seen more clearly by the other camera. This is because the far edge of one camera becomes the near edge of the other camera, and vice versa. Hence, each camera can focus on one of the edges, and the other out-of-focus edge may be in focus to the other camera. As a result, the overall DOF of camera setup 500 can be increased.

For example, camera 504 can be focused on the left edge of object 510, which is the near edge with respect to camera 504. The right edge of object 510 is at the far edge with respect to camera 504 and may be out of focus to camera 504 due to the limited DOF of camera 504. However, from the point of view of camera 506, the right edge of object 510 is at its near edge. Camera 506 can focus on the right edge of object 510, leaving the left edge of object 510 out of focus. When data from both cameras are combined, the out-of-focus data can be removed, and a clear image can be generated. In some embodiments, when creating a 3D image of object 510, the system may select data from camera 504 that represent the left-side portion (one half or two-thirds) of object 510 and select data from camera 506 that represent the right-side portion (one half or two-thirds) of object 510. By combining the selected data from both cameras, the system can generate an in-focus 3D image. In an alternative embodiment, the system can preset a blurriness threshold and discard data exceeding the blurriness threshold before combining data from both cameras.

One can further increase the DOF of the two-camera setup by slightly tilting the image sensor within each camera. More specifically, a tilting sensor plane can result in the DOF increasing on one side while decreasing on the other side. By carefully configuring the tilt angle of image sensors in both cameras, one can increase the effective DOF of the camera system.

Figure 6:
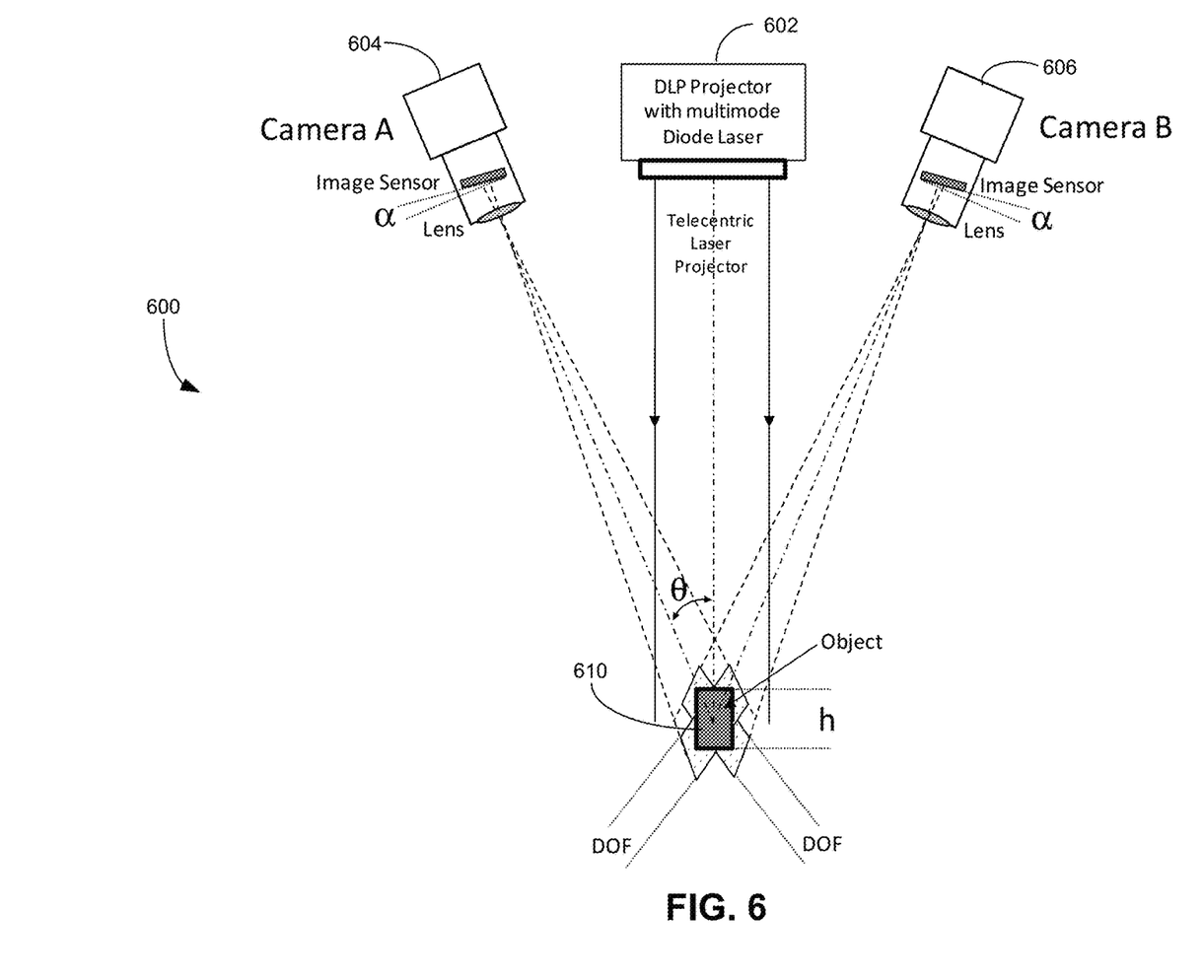
FIG. 6 illustrates in more detail an exemplary two-camera setup with tilted image sensors, according to one embodiment.

FIG. 6 illustrates in more detail an exemplary two-camera setup with tilted image sensors, according to one embodiment. Two-camera setup 600 can be very similar to two-camera setup 500, and can include structured-light projector 602, left camera 604, and right camera 606. Unlike in two-camera setup 500, where an image sensor of a camera is placed in parallel to the lens of the camera, left and right cameras 604 and 606 have their image sensors tilted at a small angle with respect to their lenses. According to the Scheimpflug principle, when the camera's lens plane is not parallel to its image plane, the DOF of the camera no longer extends between parallel planes on either side of the plane of focus (POF). In contrast, the DOF of the camera becomes wedge-shaped, with the apex of the wedge at the POF rotation axis. More specifically, the DOF can increase on the side where the lens is further away from the image plane and decrease on the side where the lens is closer to the image plane.

In FIG. 6, the image sensor of each camera can be tilted such that the DOF of the camera can be increased at the respective near edge of object 610. More specifically, when viewed from the front, the left edge of the image sensor of left camera 604 tilts away from the lens, forming an angle α with the lens. Similarly, the right edge of the image sensor of right camera 606 tilts away from the lens, forming an angle α with the lens. For left camera 604, its DOF at the left edge of object 610 can be increased, although its DOF at the right edge of object 610 is decreased. For right camera 606, its DOF at the right edge of object 610 can be increased, although its DOF at the left edge of object 610 is decreased. As a result, when data from the two cameras are combined, the overall DOF of two-camera setup 600 can be increased compared to two-camera setup 500 shown in FIG. 5. In some embodiments, the overall DOF of two-camera setup 600 can be between 10 and 20 mm. Tilt angle α can be configured to be between 0° and 8°. Note that a larger tilt angle may cause too much distortion at the far edge of object 610, which may not be able to be compensated for by the other camera.

Figure 7:
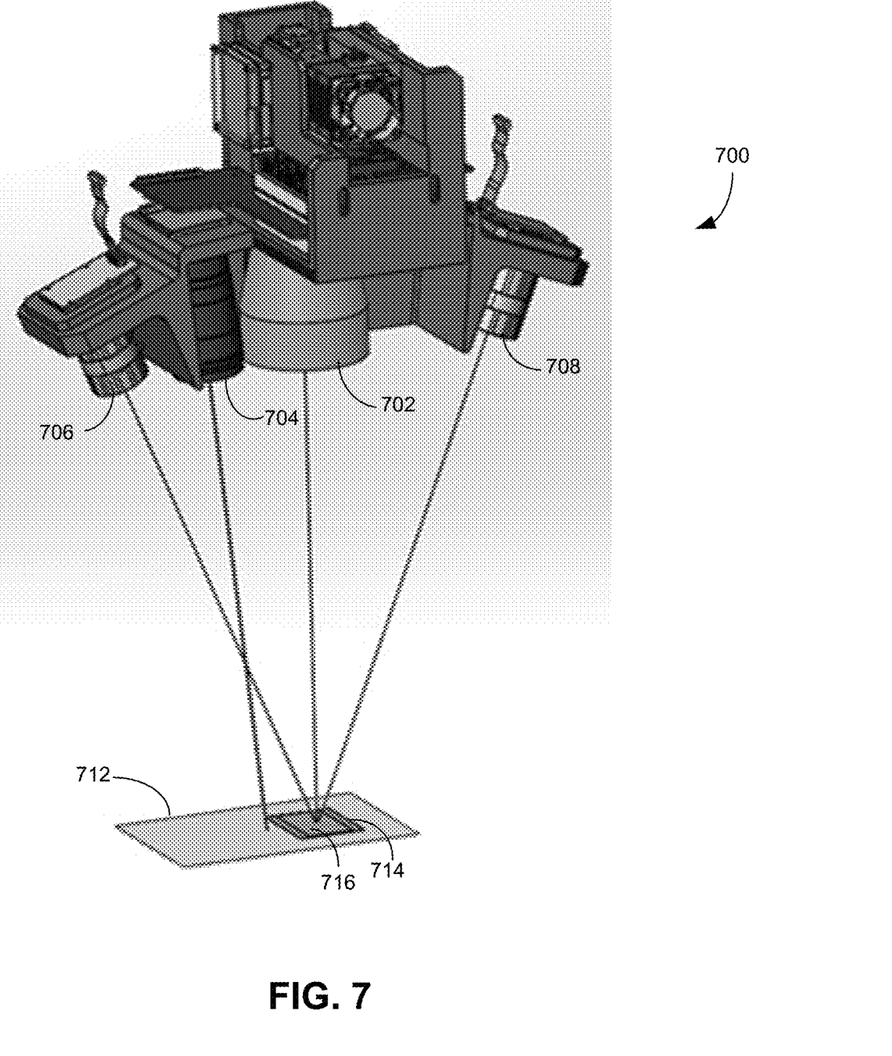
FIG. 7 shows a perspective view of the exemplary 3D machine-vision system, according to one embodiment.

FIG. 7 shows a perspective view of the exemplary 3D machine-vision system, according to one embodiment. 3D machine-vision system 700 can include a structured-light projector 702, a 2D camera 704, a left 3D camera 706, and a right 3D camera 708. Structured-light projector 702 can have a similar structure as the one shown in FIG. 3. In some embodiments, 3D machine-vision system 700 can be designed to be compact, making it suitable to be implemented in various assembly-line environments, including in situations where space can be the constraining factor. More specifically, each dimension of 3D machine-vision system 700 can be a few hundred millimeters. For example, the height of 3D machine-vision system 700 can be between 200 mm and 250 mm, its width can be between 300 mm and 400 mm, and its depth can be between 150 mm and 200 mm.

In the example shown in FIG. 7, 3D machine-vision system 700 can include only one 2D camera (i.e., camera 704), which is located on one side of structured-light projector 702 and can have a relatively large FOV (e.g., FOV 712). In some embodiments, the FOV of 2D camera 704 can be a few hundred $cm^2$ (e.g., 15 cm×10 cm). The relatively large FOV allows 2D camera 704 to be used to perform a quick search for a targeted object. An additional 2D camera can also be included to extract 3D information of the scene during the initial search.

3D cameras 706 and 708 can each have a higher resolution and smaller FOV than 2D camera 704. In some embodiments, the FOVs of 3D cameras 706 and 708 can substantially overlap each other, as indicated by region 714. Moreover, the field of projection (FOP) of structured-light projector 702 (i.e., FOP 716) can mostly fall within the FOVs of 3D cameras 706 and 708. The FOP of structured-light projector 702 can be a few centimeters by a few centimeters (e.g., 5 cm×3 cm), and the FOV of each 3D camera can be similar in size (e.g., 6 cm×4 cm). The distance between 3D machine-vision system 700 to the object plane can be a few hundred millimeters (e.g., 300 mm).

Figure 8:
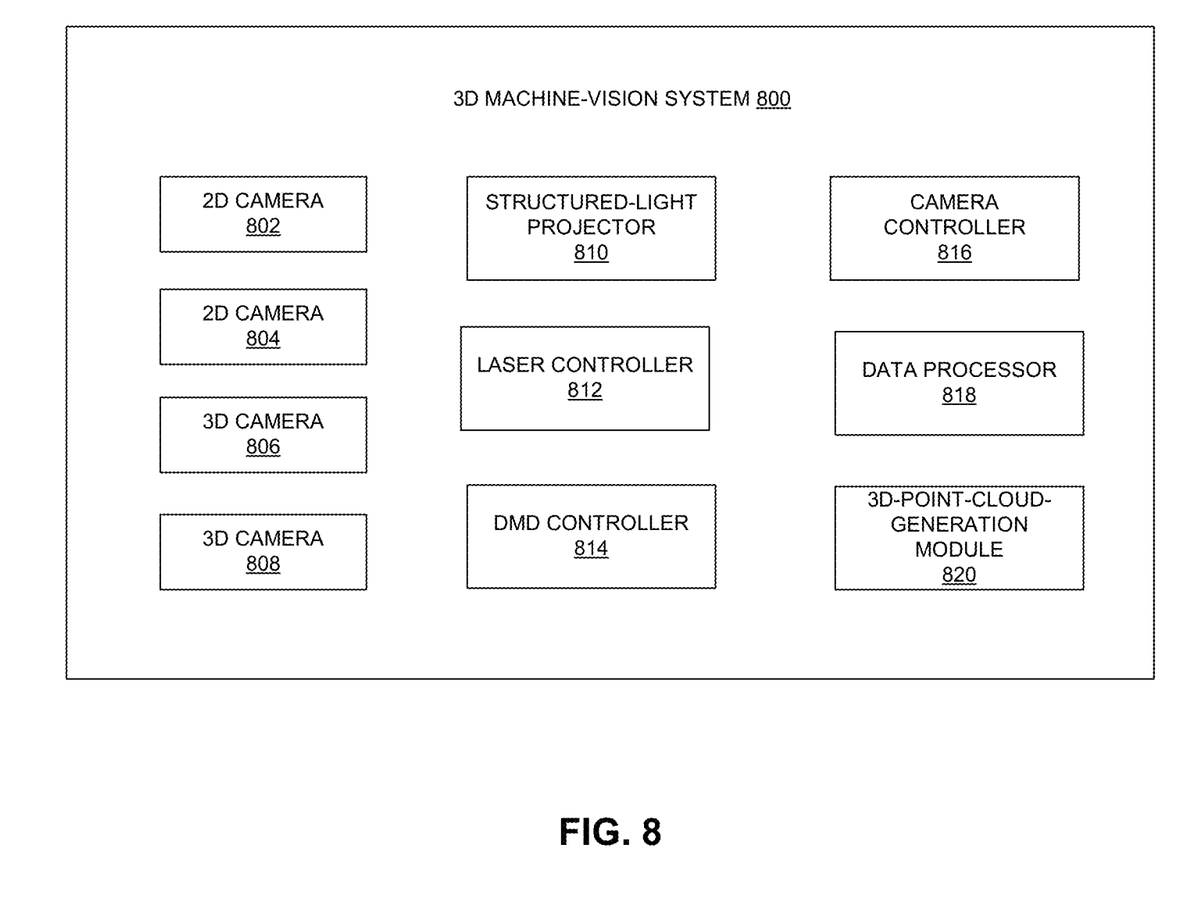
FIG. 8 shows the block diagram of an exemplary 3D machine-vision system, according to one embodiment.

FIG. 8 shows a block diagram of an exemplary 3D machine-vision system, according to one embodiment. In addition to the optical modules (e.g., 2D camera modules 802 and 804, 3D camera modules 806 and 808, and structured-light projector 810), 3D machine-vision system 800 can also include a number of control modules, including but not limited to: laser controller 812, DMD controller 814, camera controller 816, data processor 818, and 3D-point-cloud-generation module 820.

Laser controller 812 can be responsible for controlling the laser within structured-light projector 810. More specifically, laser controller 812 can control the emitting wavelength and intensity of the laser based on the surface condition of the illuminated component. DMD controller 814 can be responsible for controlling the DMD within the structured-light projector. For example, DMD controller 814 can control the pattern and frame speed of the projected light. The projected patterns can include dot arrays, parallel lines, grids, etc., and the frame speed can be between 10 and 20 frames per second. Higher frame rates can also be possible.

Camera controller 816 can be responsible for controlling the operations of the cameras (e.g., the shutter speed and aperture settings). In some embodiments, the camera controller 816 can include separate modules for controlling each individual camera. Alternatively, a pair of cameras (e.g., 3D cameras 806 and 808) can be controlled by a single module because they operate in sync with each other. Moreover, DMD controller 814 and camera controller 816 can communicate with each other such that the operations of 3D cameras 806 and 808 and structured-light projector 810 can be synchronized.

Data processor 818 can be responsible for processing data provided by image sensors of the cameras. Various digital image processing technologies, such as filtering, can be used to process the data. Moreover, various structured-light algorithms can also be used by data processor 818 to extract 3D information from 3D cameras 806 and 808. Data processor 818 can also combine image data provided by multiple cameras to obtain higher quality image data. For example, by combining data from 2D cameras 802 and 804, data processor 818 can obtain 3D information from the scene without the involvement of structured-light projector 810. In addition, by combining data from 3D cameras 806 and 808, data processor 818 can eliminate specular reflections captured by each single camera and can increase the overall DOF of 3D machine-vision system 800. In some embodiments, while processing data, data processor 818 is configured to limit the dynamic range of the data (e.g., delete certain data points that exceed the predetermined dynamic range) in order to reduce or eliminate specular reflection.

3D-point-cloud-generation module 820 can generate a 3D point cloud based on output of data processor 818. Depending on the resolution of the image data, 3D-point-cloud-generation module 818 can generate a low- or high-resolution 3D point cloud. For example, 3D-point-cloud-generation module 820 can generate a 3D point cloud based on data from 2D cameras 802 and 804. The generated 3D point cloud can be low resolution and less accurate. On the other hand, 3D-point-cloud-generation module 820 can also generate a high-resolution 3D point cloud based on data from 3D cameras 806 and 808. The 3D point cloud can then be used by the control module of the robot to guide the operation of the robot.

Figure 9:
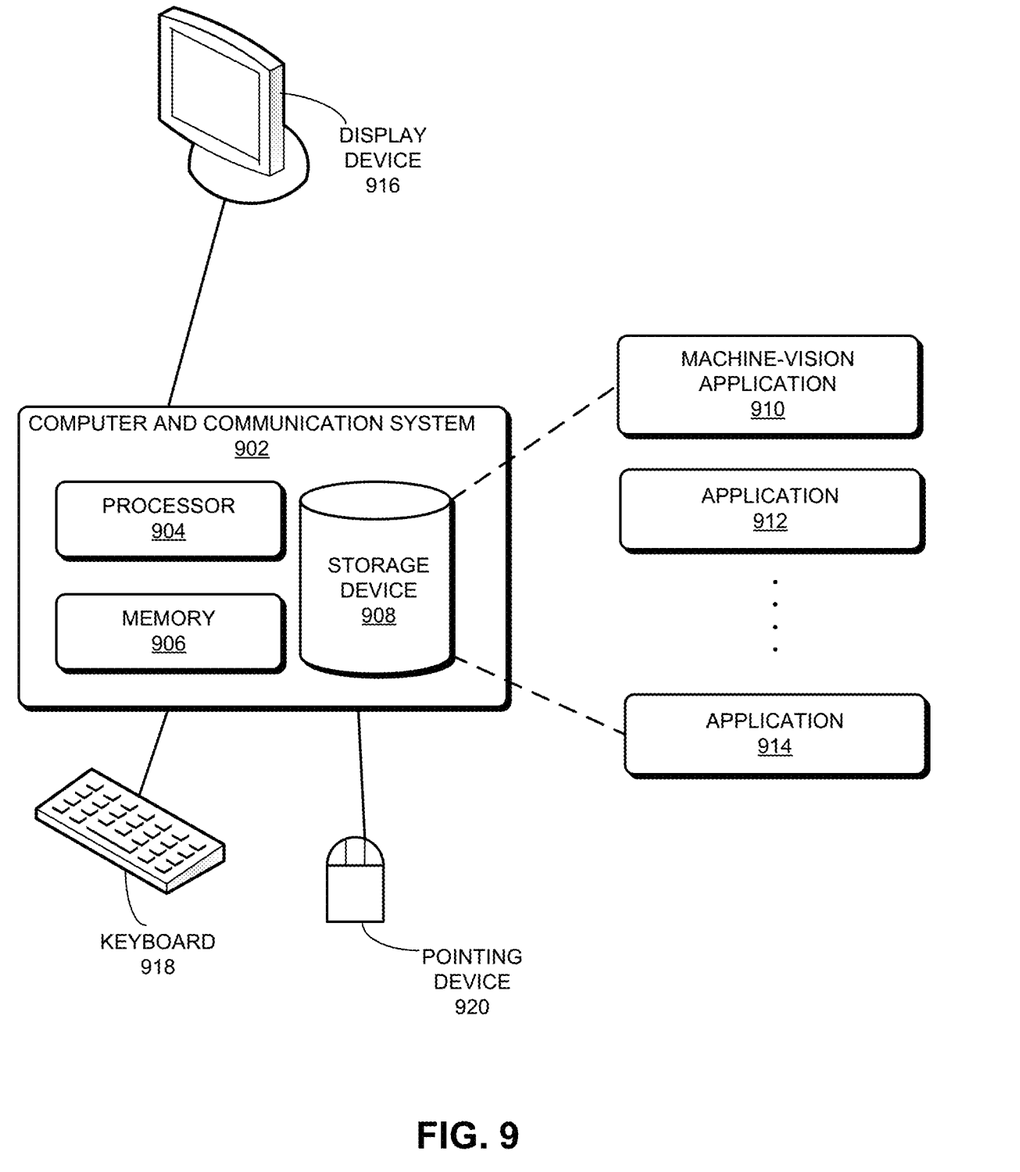
FIG. 9 illustrates an exemplary computer and communication system that facilitates the 3D machine-vision system, according to one embodiment.

FIG. 9 illustrates an exemplary computer and communication system that facilitates the 3D machine-vision system, according to one embodiment. A computer and communication system 902 includes a processor 904, a memory 906, and a storage device 908. Storage device 908 stores various applications that can be used to facilitate operations of the 3D machine-vision system, such as a machine-vision application 910, as well as other applications, such as applications 912 and 914. During operation, machine-vision application 910 can be loaded from storage device 908 into memory 906 and then executed by processor 904. While executing the program, processor 904 performs the aforementioned functions. Computer and communication system 902 is coupled to an optional display 916, keyboard 918, and pointing device 920.

In general, embodiments of the present invention can provide a 3D machine-vision system that can be used to facilitate operations of a robotic system. The 3D machine-vision system can include multiple cameras capable of providing various resolutions and speeds. For example, one or more low-resolution cameras can provide large FOVs and operate at a higher speed, thus allowing the robotic system to identify and/or locate a component quickly. Once the component is identified and/or located, other cameras can provide high-resolution 3D images that can guide the operation of the robotic arm. The laser-based structured-light projector can produce higher intensity illumination and is more energy-efficient than a conventional LED-based projector. The two-camera setup can reduce or eliminate specular reflection and can increase the overall DOF. Moreover, the cameras can be configured such that the lens of each camera can tilt at an angle with respect to the image plane of the camera, thus further enhancing the overall DOF of the 3D machine-vision system.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A machine-vision system, comprising:
a structured-light projector;
a first camera positioned on a first side of the structured-light projector; and
a second camera positioned on a second side of the structured-light projector, wherein the first and second cameras are configured to capture images under illumination of the structured-light projector; and
wherein the structured-light projector comprises a laser-based light source.

2. The machine-vision system of claim 1, wherein the laser-based light source comprises at least one multimode semiconductor laser diode.

3. The machine-vision system of claim 1, wherein an optical axis of the first or second camera and an optical axis of the structured-light projector form an angle that is between 20° and 30°.

4. The machine-vision system of claim 3, wherein a field of view (FOV) of the first camera substantially overlaps a FOV of the second camera.

5. The machine-vision system of claim 1, wherein the structured-light projector is configured to project one or more of:
a binary encoded pattern; and
a non-binary encoded pattern.

6. The machine-vision system of claim 1, further comprising an image-processing unit configured to process images provided by the first and second cameras, wherein the image-processing unit is configured to adjust an allowed dynamic range of the images provided by the first and second cameras, thereby reducing specular reflection included in the images.

7. The machine-vision system of claim 1, wherein the structured-light projector comprises a digital micromirror device (DMD).

8. The machine-vision system of claim 7, wherein the structured-light projector comprises a double-telecentric lens for expanding a beam reflected by the DMD while maintaining parallelism of the beam.

9. The machine-vision system of claim 1, further comprising a third camera positioned between the first camera and the structured-light projector, wherein the third camera is configured to capture images under normal illumination.

10. The machine-vision system of claim 9, wherein a field of view (FOV) of the third camera is larger than a FOV of the first or second camera.

11. The machine-vision system of claim 9, further comprising a fourth camera positioned between the second camera and the structured-light projector, wherein the fourth camera is configured to capture images under normal illumination.

12. The machine-vision system of claim 1, wherein the first or second camera comprises a lens and an image sensor, and wherein the image sensor is tilted at an angle with respect to the lens.

13. The machine-vision system of claim 12, wherein the angle is between 0° and 8°.

14. A structured-light projector for a 3D imaging system, comprising:
a laser-based light source;
a collimator for collimating light emitted by the light source;
a digital micromirror device (DMD) for reflecting the collimated light; and
a beam expander for expanding a light beam reflected off the DMD while maintaining parallelism of the beam.

15. The structured-light projector of claim 14, wherein the laser-based light source comprises at least one multimode semiconductor laser diode.

16. The structured-light projector of claim 14, wherein the structured-light projector is configured to project one or more of:
 a binary encoded pattern; and
 a non-binary encoded pattern.

17. The structured-light projector of claim 14, wherein the beam expander comprises a double-telecentric lens.

18. The structured-light projector of claim 14, wherein a frame rate of the structured-light projector is at least 10 frames per second.

19. The structured-light projector of claim 14, wherein the DMD comprises a two-dimensional array of micromirrors.

* * * * *